July 11, 1972    H. T. SAWYER    3,676,218
SONIC ENERGY CLEANING METHOD
Filed Sept. 2, 1969    5 Sheets-Sheet 3
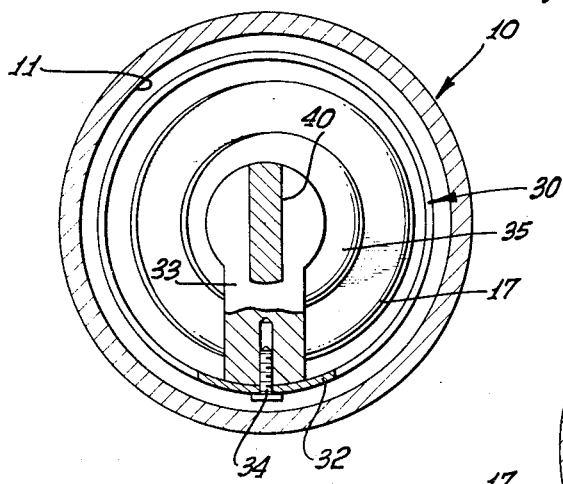
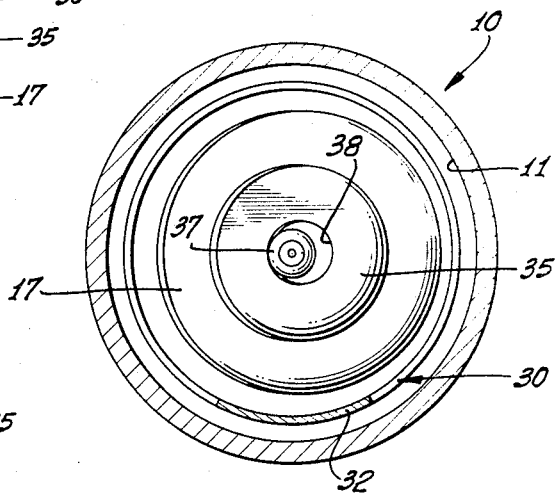
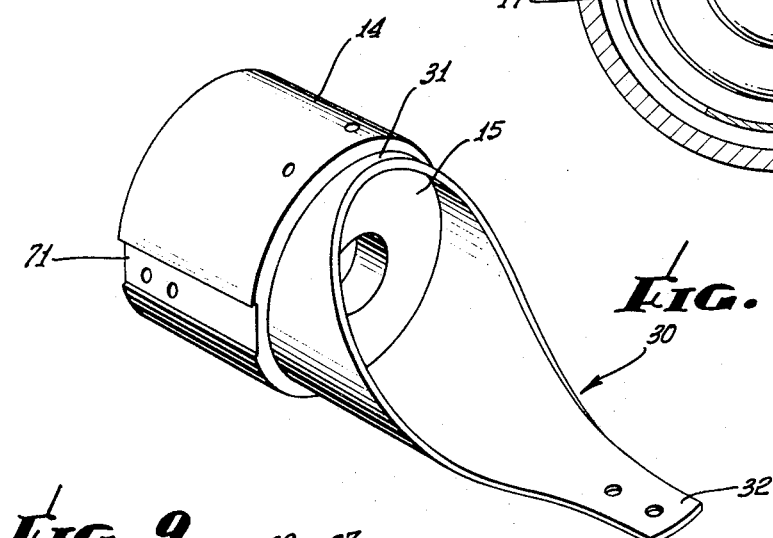
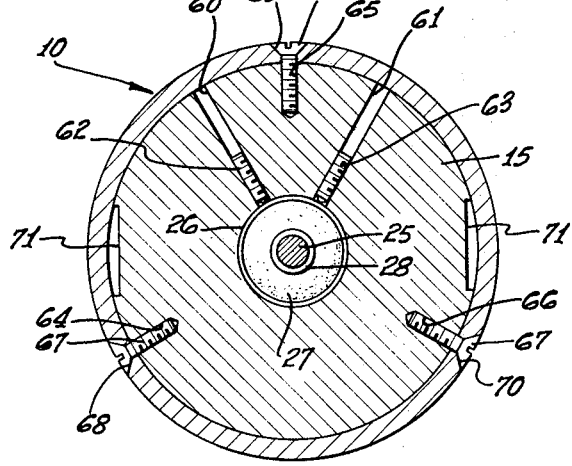
INVENTOR.
HAROLD T. SAWYER
ATTORNEYS.

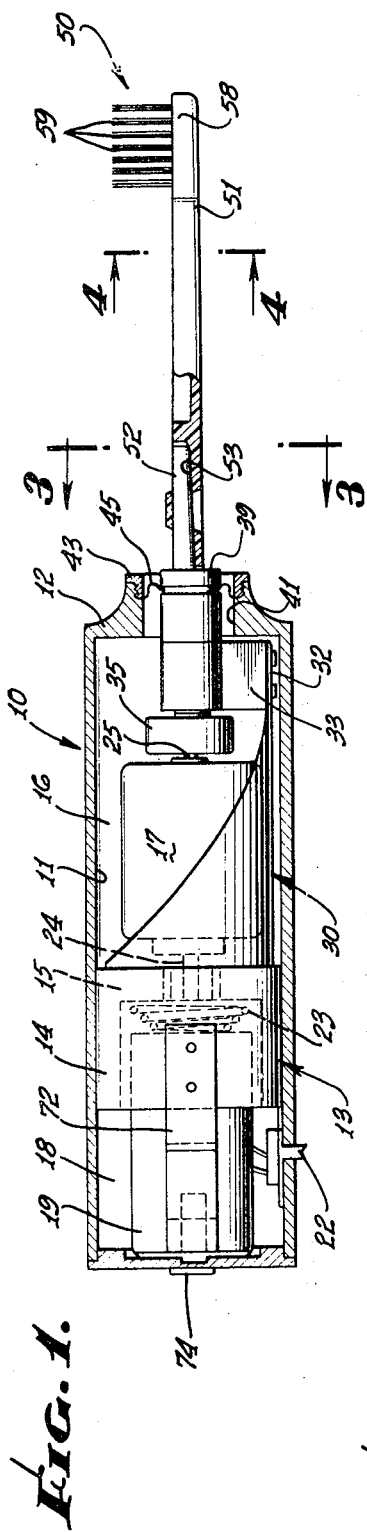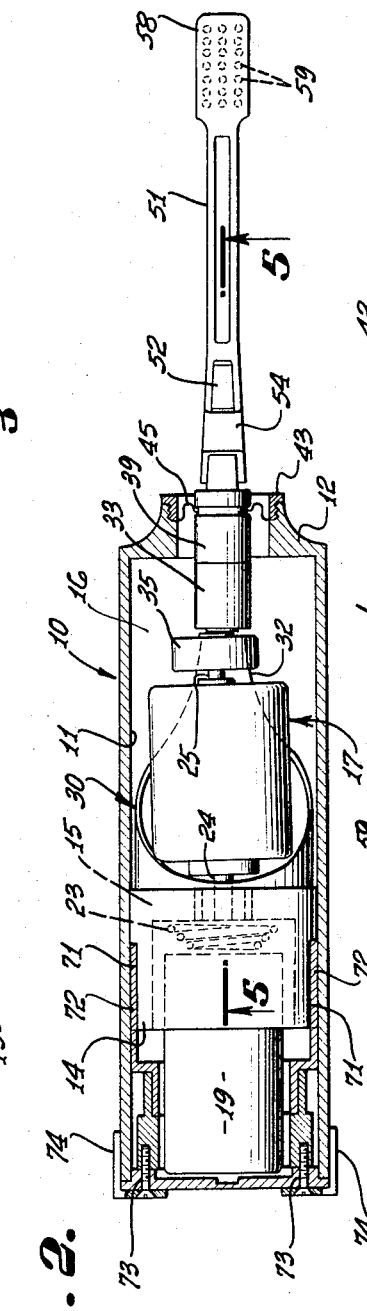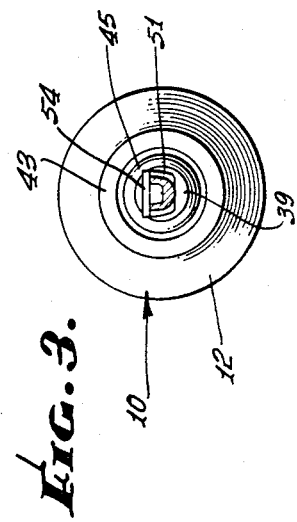

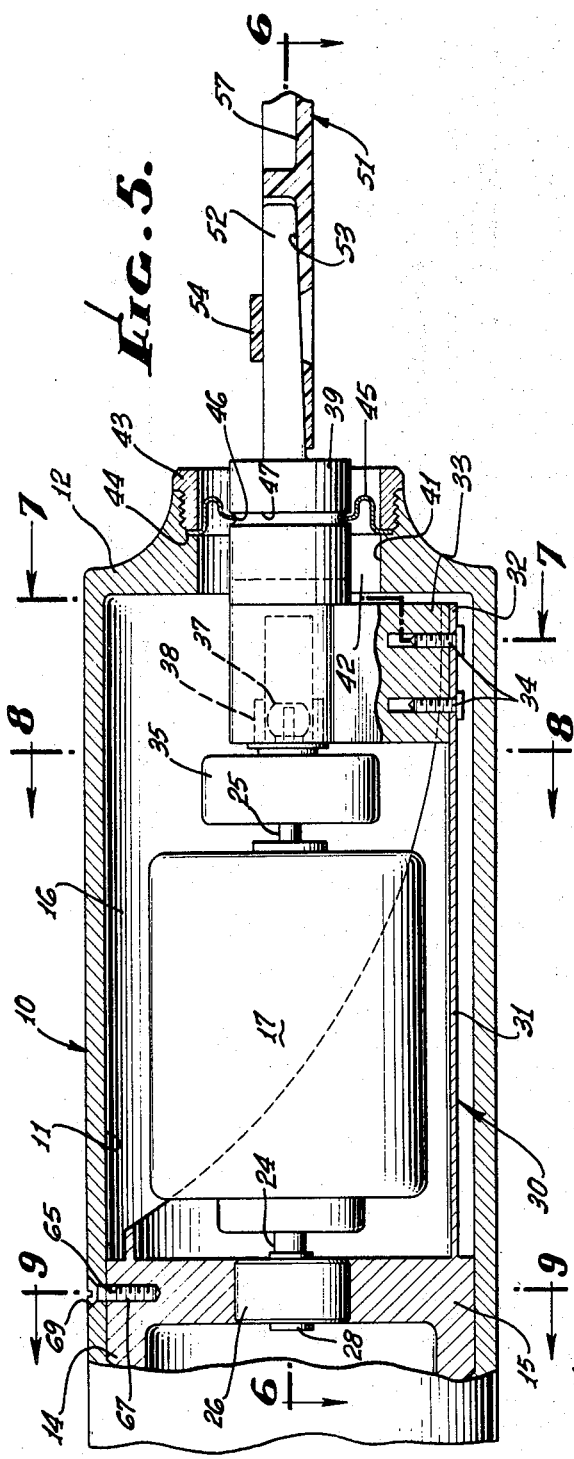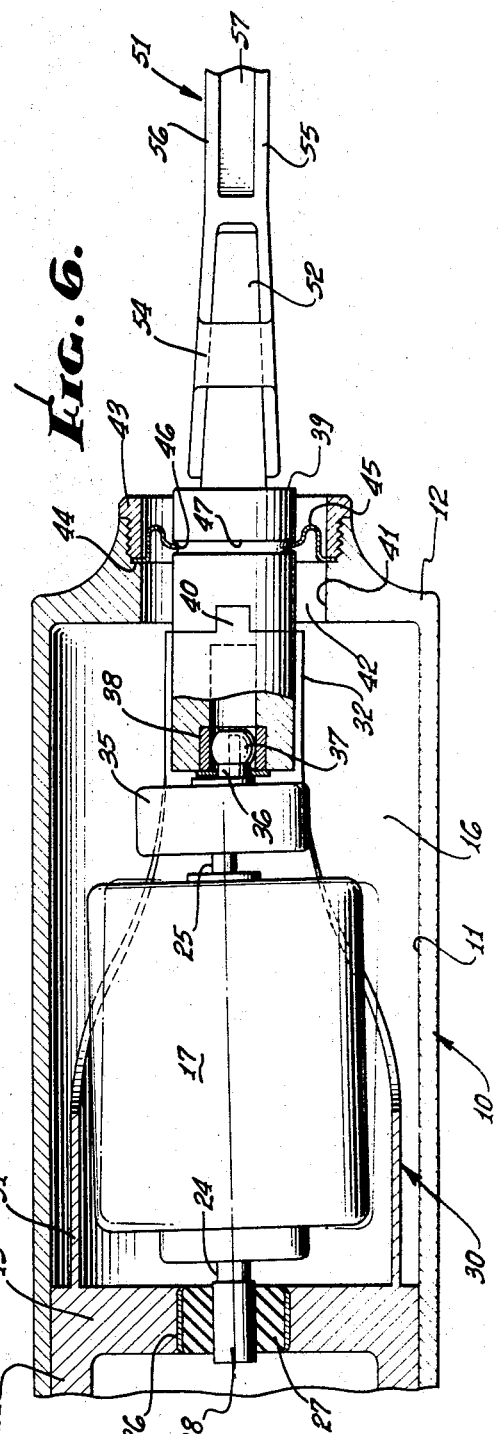

July 11, 1972     H. T. SAWYER     3,676,218
SONIC ENERGY CLEANING METHOD
Filed Sept. 2, 1969     5 Sheets-Sheet 4
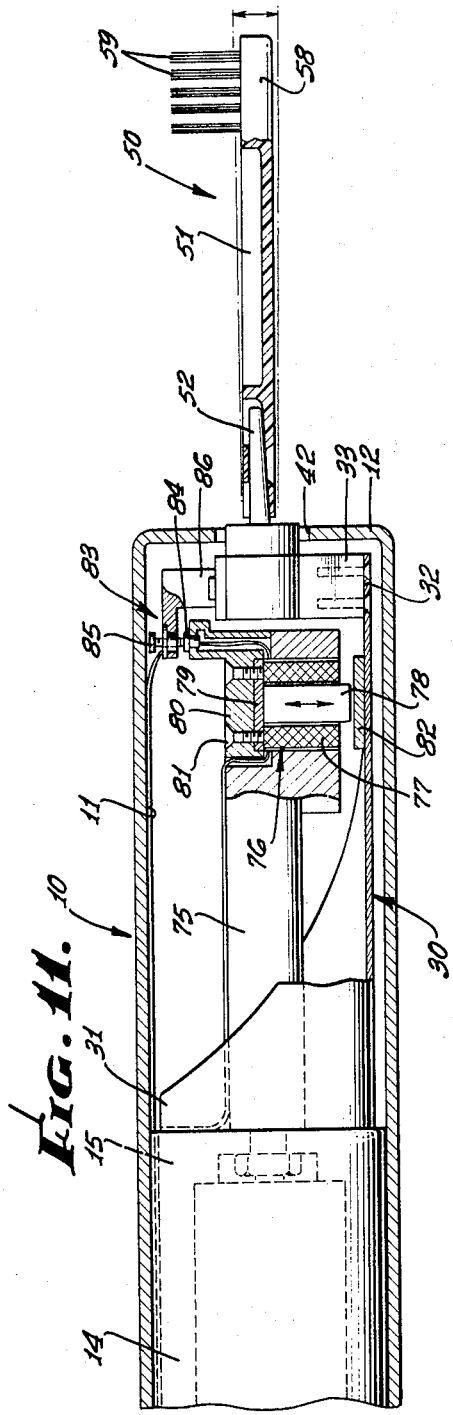
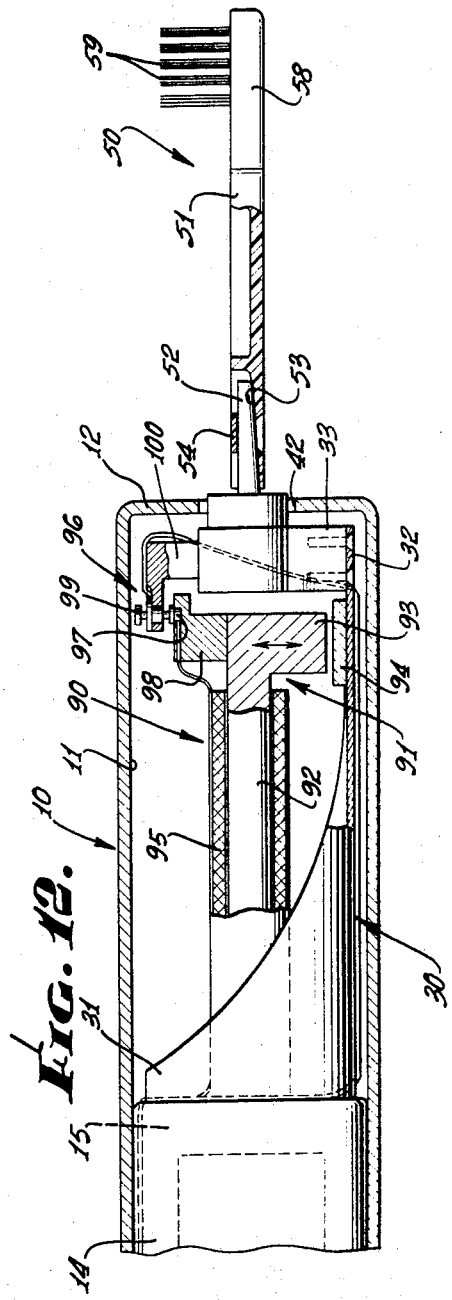
INVENTOR.
HAROLD T. SAWYER
ATTORNEYS.

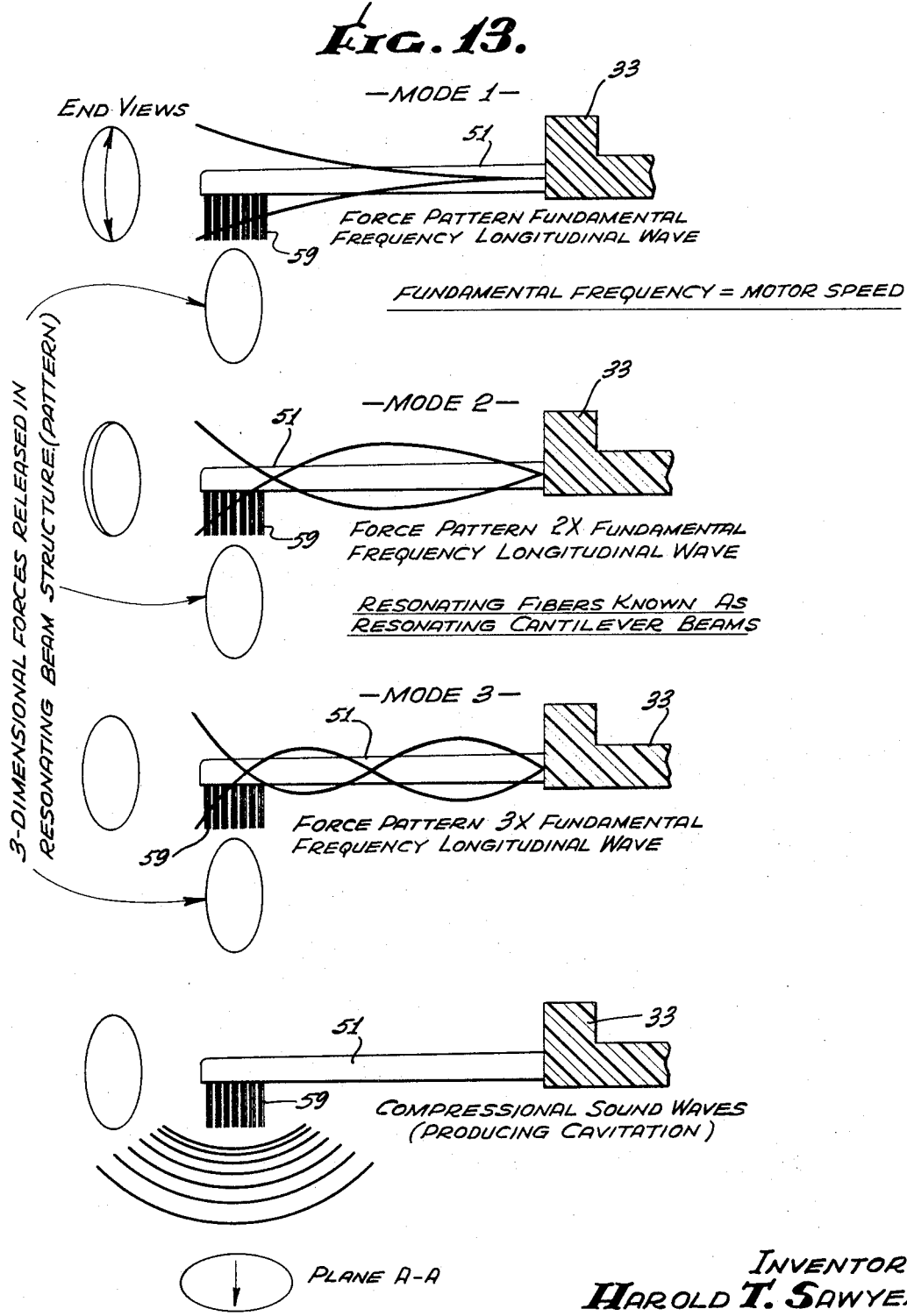

United States Patent Office 3,676,218
Patented July 11, 1972

3,676,218
SONIC ENERGY CLEANING METHOD

Harold T. Sawyer, Pacific Palisades, Calif., assignor of a fractional part interest to Vernon D. Beehler, Los Angeles, Calif.

Continuation-in-part of applications Ser. No. 631,736, Apr. 18, 1967, now Patent No. 3,507,695, Ser. No. 658,673, Aug. 7, 1967, now Patent No. 3,535,726, and Ser. No. 832,156 and Ser. No. 832,180, both June 11, 1969. This application Sept. 2, 1969, Ser. No. 854,363

Int. Cl. A61c 17/00

U.S. Cl. 134—1                                     3 Claims

ABSTRACT OF THE DISCLOSURE

A resonating toothbrush for cleaning teeth which is electrically operated. A housing is provided which serves as a handle and as a container for a rechargeable electric battery and, in the preferred embodiment, an electric motor. Extending parallel to the motor is an arm anchored to the housing on a partition which separates the battery from the motor and having a free end near the base of the toothbrush shaft. There is an eccentric connection between the motor shaft and the free end of the arm which when actuated, resonates the free end of the arm much the same as the action of free resonant motion of the arms of a tuning fork. A corresponding motion is thereby imparted to the shaft of the toothbrush which ultimately sets the bristle end of the brush and the bristles in resonance at the fundamental frequency or at any of the multiples of fundamental frequency.

---

The application herein is a continuation-in-part of applicant's copending applications Ser. No. 658,673 filed Aug. 7, 1967, now Pat. 3,535,726, Ser. No. 631,736 filed Apr. 18, 1967 now Pat. 3,507,695, Ser. No. 832,156 filed June 11, 1969 and Ser. No. 832,180 filed June 11, 1969.

Prior art electric toothbrushes operate on a principle different from that described. Such prior art devices depend upon a scrubbing or friction action of the bristles produced by action of an electric motor, usually operating at low frequencies of about 30 cycles. Higher frequencies generally are not practical because the equipment would be too heavy.

More particularly, in some conventional electric toothbrushes the brush bristles oscillate about a fixed radius and the bristles contact the teeth surfaces at the radius of contact. Because of this limited motion, the bristles do not completely contact the entire surface area. Others operate by friction motion in a plane in line with the brush shaft. Cleaning is accordingly accomplished by alternately brushing the teeth in an upward and downward direction or in a sliding motion and at points essentially perpendicular to the surface and in line with the teeth formation. Frictional application of tooth paste by use of the bristles is the principle. The action is one tending to sweep food particles under the gums or dentures and into the tooth crevices. To avoid the danger of imposing alternating current on the body, batteries are relied upon and for the friction principle thus described battery power is not entirely adequate. Further because of the brush motion produced by this system, the tendency is to fling tooth paste from the bristle surfaces rather than to work it against the teeth.

Applicant's method is an adaptation and refinement of a procedure making use of resonating frequency devices and cavitation produced by sound energy transmitted through a fluid body to loosen dirt from the surface and crevices without resort to frictional force. The structure employed herein is one making use of a cantilever resonating beam, such as the shaft of a toothbrush, the beam being motion driven into resonance releasing sonic energy. The output force at the eccentric location is sinusoidal in nature and at a fundamental frequency which is identical to the motor speed. The amplitude of the force is in proportion to the product of the motor mass and its eccentric throw which may be described as being at the pedestal bearing. The structure as such may be designed to resonate freely at its first mode of resonance, namely fundamental frequency, or, when as herein disclosed the cleaning of teeth is the object, the brush and its shaft and mounting serving as a resonating cantilever beam may be designed for resonance at the second or third modes, namely several times the fundamental frequency or at even higher frequencies, without any change from an original source of energy.

It is therefore among the objects of the invention to provide a new and improved power operated cleaning method which is efficient, operates at relatively low power considering the efficiency, and provides particularly effective discernment of the object to be cleaned and the areas around it.

Another object of the invention is to provide a new, faster and improved cleaning method which makes use of a shank in the form of a cantilever resonating beam with a cleaning element at its free end.

Another object of the invention is to provide a new and improved power operated tooth cleaning method which though battery operated is adequate and effective to clean teeth and the cavities therebetween and surrounding gums by employment of a combined application of sound energy with cavitation under circumstances where the teeth are moistened and immersed in a cleaning medium, with the added advantage of the cleaning taking place by merely having the toothbrush in gentle engagement with the teeth without reliance upon friction or pressure.

Still another object of the invention is to provide a new and improved power operated tooth cleaning method which is simple, effective and modestly priced, the method being one making use of tools which are relatively simple, operating portions of the tools being effectively sealed within a housing to avoid prospect of damage by water and cleaning materials.

Another object of the invention is to make use of work energy by utilizing the inertia available in a resonating beam structure.

Another object of the cleaning device is to provide a method capable of cleaning by cavitation through the use of frequencies at or above the fundamental mode.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIG. 1 is a longitudinal sectional view of a device for use of the method complete with a toothbrush.

FIG. 2 is a longitudinal sectional view in a direction 90 degrees with respect to FIG. 1.

FIG. 3 is a cross-sectional view on the line 3—3 of FIG. 1.

FIG. 4 is a cross-sectional view on the line 4—4 of FIG. 1.

FIG. 5 is a fragmentary enlarged longitudinal sectional view showing further details not revealed in FIG. 1.

FIG. 6 is a fragmentary enlarged sectional view on the line 6—6 of FIG. 5.

FIG. 7 is a cross-sectional view on the line 7—7 of FIG. 5.

FIG. 8 is a cross-sectional view on the line 8—8 of FIG. 5.

FIG. 9 is a cross-sectional view on the line 9—9 of FIG. 5.

FIG. 10 is a side perspective view of the arm which actuates the brush handle.

FIG. 11 is a longitudinal sectional view of a second form of the invention.

FIG. 12 is a longitudinal sectional view of a third form of the invention.

FIG. 13 is a series of schematic views illustrating the action imparted to a cleaning device such as a toothbrush by the operating source embodied in the invention.

In an embodiment of the invention chosen for the purpose of illustrating the method, there is shown a tubular or cylindrical housing 10 having a chamber 11 therein, one end of which is defined by an outer end wall 12. A battery casing 13 closes the other end. The battery casing consists of an inner section 14 providing a partition 15 which defines a space 16 in which is located an electric motor 17. An outer section 18 of the battery casing 13 together with the inner section 14 houses a rechargeable battery 19. A cover 20 is fastened to a sleeve 21 which in turn is joined to the outer section 18. Following conventional practice the battery 19 is provided with a switch 22 and recharging contacts (not shown). A spring 23 secures the battery 19 in proper position.

The motor 17, located as shown in the space 16, has a drive shaft 25, a left end as shown in FIGS. 1, 2, 5, and 6 being mounted on the partition 15. The mounting for the left end of the motor frame 24 includes a separate stub shaft which is a combination isolator and support bearing consisting of an annular jacket 26, which may be of metal, which houses and contains an annular bushing 27 of compounded elastomeric material, several varieties of which are currently commercially available. An enlargement 28 of the drive shaft 25 is firmly embedded in the bushing 27.

For mounting the other or right hand end of the motor 17 as viewed in FIGS. 1, 2, 5, and 6, there is provided an arm, in the nature of a tuning fork, indicated generally by the reference character 30, a base 31 of which is substantially tubular thereby forming an arc of 360 degrees for a portion of the length of the arm. The base may be an integral portion of the partition 15 as shown herein, or integrally fastened to it by appropriate conventional means. An opposite free end 32 of the arm 30 is of appreciably smaller circumferential length, such that, as shown in FIG. 10, it is for all practical purposes relatively flat. The intermediate portion of the arm is an arc which diminishes progressively from the 360 degree length at the base 31 to the free end 32 and accordingly the stiffness of the arm diminishes progressively from the base to the free end.

At the free end 32 is a block 33 fastened to the free end by screws 34.

At the right hand end of the drive shaft 25 is an inertial wheel 35 and eccentrically mounted on the inertial wheel is a stub shaft 36 supporting an exteriorly rounded self-aligning bearing member 37. The bearing member 37 is designed to be contained within and to cooperate with an annular bearing 38 which is anchored in the block 33. Mounted and assembled as described, when the motor drive shaft 25 is rotated, the self-aligning bearing member 37 is rotated eccentrically with respect to the motor mass thereby to transmit a substantially sinusoidal force motion to the block 33 and free end 32 of the arm 30. The construction of the arm, as previously described, is such, however, as to be free to resonate and thusly generating sinusoidal force motions in all three planes as shown in FIGS. 1, 5 and 7.

For convenience in construction, assembly and servicing, the block 33 has attached thereto a cylindrical extension 39 to which it is joined in this instance by a tongue and groove joint 40. The cylindrical extension 39 is in concentric alignment with an annular area 41 of the end wall 12 which forms an opening 42 through the end wall. An annular screw cap 43 serves to anchor the outer perimeter 44 of an annular flexible seal 45 in position in the end wall. The inner perimeter 46 of the flexible seal 45 is compressed in a sealing groove 47 within the exterior circumference of the cylindrical extension 39.

A cleaning appliance here shown in the form of a toothbrush 50 has a shaft 51 thereof of such construction that it is releasably secured to a projection 52 of the cylindrical extension 39. A recess 53 receives the extension 39 on one side and a web 54 overlies the extension 39 on the opposite side. The shaft 51 is in this instance preferably channel-shaped in cross-section as shown in FIG. 4, having legs 55 and 56 and a web 57. At the outer end of the shaft 51 is in this instance an enlarged relatively flat section 58 on which are mounted tufts 59 of individual bristles, the shaft serving as an extension of the arm 30.

For convenience in assembling the device, the partition 15 is provided with threaded bores 60 and 61 accommodating set screws 62 and 63, respectively, for anchoring the isolator bearing 26 in position. Circumferentially spaced bores 64, 65, and 66 accommodate flat head screws 67 which extend through openings 68, 69 and 70 in the housing 10 to hold the inner section 14 in proper position in the housing 10. Slots 71 are provided to accommodate elements 72 with the aid of which the cover 20 is held in place by screws 73. These screws also hold contact elements 74 which, being connected to the battery in the usual fashion provide for recharging.

In the embodiment of FIG. 11, there is provided an anchoring projection 75 extending from the partition 15 into the chamber 11 which serves as a firm mounting for an electro-magnetic actuator, indicated generally by the reference character 76. The electro-magnetic actuator includes a coil 77 surrounding a core 78, the core forming part of a magnetic circuit. To complete the magnetic circuit, there is provided a base plate 79 anchored to a section 80 of the projection 75 by screws 81 and a magnetic plate 82 adjacent the free end of the arm 30 a substantially make-and-break contact 83 has a stationary part 84 mounted on the section 80 of the anchoring projection 75 and a movable part 85 mounted upon an extension 86 of the block 33 which is anchored to the free end of the arm 30. Hence, as the free end of the arm 30 flexes the make-and-break contact is alternately closed and opened, thus ultimately interrupting the circuit to the electro-magnetic actuator 76.

In still another form of the invention, illustrated in FIG. 12, there is an electro-magnetic actuator indicated generally by the reference character 90, wherein a core 91 in the form of an elongated shank 92 is fixed on the partition 15 and a head 93 at the free end of the shank located adjacent a magnetic plate 94, the magnetic plate 94 in turn being secured to the free end of the arm 30. On this occasion an elongated coil 95 surrounds the shank 92 and when energized sets up a magnetic condition in the shank 92 and head 93. A make-and-break contact 96 has a stationary part 97 mounted on an extension 98 of the head 93 and a movable part 99 carried by an extension 100 of the block 33. The sequence of operation of the parts of FIG. 12 are substantially the same as for those of FIG. 11. Other details of the embodiment of FIGS. 11 and 12 are substantially the same as for the first described form of the invention.

In the schematic representations of FIG. 13 the motion resulting from operation of the device is illustrated. In the schematic representation identified as Mode 1, the force pattern at fundamental frequency is shown wherein a longitudinal sound wave is generated in the block 33 and imparted to the fixed end of the shaft 51 serving as a cantilever beam. This results in a resonance of the free end of the brush on which are mounted the tufts 59 of bristles. The free end of the shaft experiences sinusoidal motions much as the leg of a tuning fork when it is resonated. The motion, however, is an ellipsoid with force motions in all three planes as indicated by the end view, so labeled.

It may be preferable, however, to so balance and relate the masses of the various parts of the structure and their relative stiffness and consistency so as to resonate the shaft 51 acting as a cantilever beam in force patterns higher than the fundamental frequency indicated by Modes 2, 3, etc. so labeled. Still further, if preferred, the force patterns may be made to act at several times the fundamental frequency as suggested by Mode 3. In this connection it should be borne in mind that the bristles are individual cantilever beams resonated in a sinusoidal elliptical pattern as indicated by the end views, but that also the flat free end of the shaft moving as it does at the frequency generated serves to generate compressional sound waves as suggested by the lowermost diagram of FIG. 13.

The cantilever resonating beam assembly may be constructed of plastic material consisting as it does of a relatively stiff shaft with cantilever resonating bristles at the outer end. The shaft is resonated by means of a sonic energy source such as an electric motor, with a connection such that the output force is sinusoidal in nature, and of a fundamental frequency which is identical to the motor speed. The amplitude of the force is in proportion to the product of the motor mass and its eccentric throw at the bearing connection to the base of the shaft which is in effect a cantilever resonating beam. The beam of course can be designed to resonate freely at its first mode of resonance or the second, third or other modes. The toothbrush assembly in the case herein described is isolated at the support end of the structure which is in effect the opposite end of the motor shaft. Because of the structural design the sonic energy is directed to the surface to be cleaned.

At the other end of the entire assembly, namely where the bristles are mounted, on a relatively flat plate, the bristles in this instance extend 90 degrees from the flat plate. The bristles in accordance with this description are rows of individual resonating cantilever beams which are resonating sinusoidally in three force planes. Together the bristles and shaft constitute a complete but composite system and are in fact sounding bodies such as a tuning fork arm. As such they produce compressional waves in different directions in the surrounding medium which when the bristles are inserted in the mouth in contact with saliva and tooth paste cause cavitation in the liquid medium. Application by the composite structure may therefore be considered three-dimensional in nature and ellipsoidal in envelope. Physical cleaning takes place at the surface of the teeth in alternate ellipsoidal three-dimensional envelopes which are in planes both parallel to, in line with, and perpendicular to the surface of the teeth. The sonic energy thusly generated, in the low sonic range, produces cavitation in the liquid medium, which completely encompasses and envelops the surfaces of the teeth, the spaces between them, and the gum areas. During the collapse phase of the infinitesimal bubbles produced by cavitation, the "vacuuming" effect dislodges contamination from the teeth which remains dislodged and in suspension.

While the invention has herein been shown and described in what is conceived to be a practical and effective embodiment, it is recognized that departures may be made therefrom within the scope of the invention.

Having described the invention, what is claimed as new in support of Letters Patent:

I claim:

1. A method of applying energy in the low sonic range for cleaning purposes by use of a handle in company with a multiple part arm comprising a tool holding part with a captive end and a work piece end and a cantilever part having a mass decreasing progressively from maximum at a stationary end to substantially minimum at a free end, said method comprising generating a sinusoidal force on the handle and blocking vibration created by the force generation from reaching the handle, applying said sinusoidal force to said free end of said cantilever part in a direction transverse to the long axis of said arm, blocking transmission of vibration energy from the free end to the stationary end of the cantilever part and simultaneously applying the work piece end of the tool holding part to the work, and continuing application of said sinusoidal force at a rate productive of flexure in the tool holding part at its fundamental frequency or some multiple thereof.

2. A method according to claim 1 including passing the sinusoidal force through cleaning bristles on the work piece end of the tool holding part wherein the axes of said bristles are transverse to the long axis of said tool holding part.

3. A method according to claim 1 including applying the work piece end to the work in the presence of a liquid.

References Cited

UNITED STATES PATENTS

| 1,342,280 | 6/1920 | Fitzgerald | 15—22 X |
| 2,439,262 | 4/1948 | Nalbach et al. | 15—22 UX |
| 3,029,651 | 4/1962 | Flatt | 15—22 X |
| 3,166,772 | 1/1965 | Bodine | 15—22 |
| 3,183,538 | 5/1965 | Hubner | 15—22 |
| 3,316,576 | 5/1967 | Urbush | 15—22 |
| 3,335,443 | 8/1967 | Parisi et al. | 15—22 |
| 3,375,820 | 4/1968 | Kuris et al. | 15—22 X |
| 3,401,690 | 9/1968 | Martin | 128—62 UX |
| 3,466,689 | 9/1969 | Aurelio et al. | 15—22 |
| 3,488,788 | 1/1970 | Robinson | 15—22 X |

MORRIS O. WOLK, Primary Examiner

D. G. MILLMAN, Assistant Examiner

U.S. Cl. X.R.

15—22 R; 128—62 R; 134—6